United States Patent
Helbling et al.

(10) Patent No.: US 8,472,606 B2
(45) Date of Patent: Jun. 25, 2013

(54) METHODS AND SYSTEMS FOR DIRECTORY INFORMATION LOOKUP

(75) Inventors: Christopher L. Helbling, Stamford, CT (US); Craig L. Reding, Midland Park, NJ (US); John R. Reformato, East Meadow, NJ (US); Mahesh Rajagopalan, Irving, TX (US); Shadman Zafar, Coppell, TX (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 996 days.

(21) Appl. No.: 10/720,868

(22) Filed: Nov. 24, 2003

(65) Prior Publication Data

US 2005/0053220 A1 Mar. 10, 2005

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002, now abandoned.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(51) Int. Cl.
H04M 3/42 (2006.01)
H04M 3/00 (2006.01)
H04M 5/00 (2006.01)

(52) U.S. Cl.
USPC ............ 379/218.01; 379/265.01; 379/265.09

(58) Field of Classification Search
USPC .................. 379/218.01, 207.02, 88.02, 67.1, 379/266.01, 265.01, 265.02, 265.09; 455/418; 709/202
See application file for complete search history.

(56) References Cited

U.S. PATENT DOCUMENTS 4,013,839 A 3/1977 Bell
(Continued)

FOREIGN PATENT DOCUMENTS

CA 2240878 12/1998
(Continued)

OTHER PUBLICATIONS

"MP3 Recorder Download—MP3 Recorder—Record Audio Stream to MP3 or WAV," 2002 http://www.mp3-recorder.net.

(Continued)

Primary Examiner — Thjuan K Addy

(57) ABSTRACT

Systems and methods are provided for obtaining contact-related information associated with a party using an identifier. The identifier may include a calling party number, a previously-dialed number, and/or a number specified by a user. The identifier could also include an e-mail address, an instant messenger address, a photograph, etc. A request for contact-related information may be initiated by a user and/or a device associated with the user. The request may include an identifier associated with a party. Methods and systems may retrieve contact-related information associated with the party using the identifier. Methods and systems may leverage one or more networks to retrieve the contact-related information. Contact information may be retrieved in order to add a contact to a user's address book.

26 Claims, 10 Drawing Sheets

U.S. PATENT DOCUMENTS

| | | |
|---|---|---|
| 4,540,850 A | 9/1985 | Herr et al. .................. 379/88.19 |
| 4,600,814 A | 7/1986 | Cunniff et al. |
| 4,734,931 A | 3/1988 | Bourg et al. |
| 4,924,496 A | 5/1990 | Figa et al. |
| 5,014,303 A * | 5/1991 | Velius ..................... 379/266.01 |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. ................ 379/93.23 |
| 5,329,578 A | 7/1994 | Brennan et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. .................. 370/261 |
| 5,638,434 A | 6/1997 | Gottlieb et al. |
| 5,649,105 A | 7/1997 | Aldred et al. |
| 5,652,789 A | 7/1997 | Miner et al. .................. 379/201 |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,745,884 A | 4/1998 | Carnegie et al. |
| 5,751,800 A | 5/1998 | Ardon |
| 5,752,191 A | 5/1998 | Fuller et al. |
| 5,764,901 A | 6/1998 | Skarbo et al. |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A | 2/1999 | Glaser et al. .................. 379/207 |
| 5,875,437 A | 2/1999 | Atkins |
| 5,903,845 A | 5/1999 | Buhrmann et al. ........... 455/461 |
| 5,907,324 A | 5/1999 | Larson et al. |
| 5,907,547 A | 5/1999 | Foladare et al. .............. 370/352 |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,944,769 A | 8/1999 | Musk et al. |
| 5,945,989 A | 8/1999 | Freishtat et al. |
| 5,960,342 A | 9/1999 | Liem et al. |
| 5,963,925 A | 10/1999 | Kolling et al. |
| 5,982,870 A | 11/1999 | Pershan et al. |
| 6,005,870 A | 12/1999 | Leung et al. |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,078,658 A | 6/2000 | Yunoki |
| 6,100,882 A | 8/2000 | Sharman et al. |
| 6,122,348 A | 9/2000 | French-St et al. |
| 6,134,318 A | 10/2000 | O'Neil |
| 6,134,548 A | 10/2000 | Gottsman et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. .............. 379/350 |
| 6,195,660 B1 | 2/2001 | Polnerow et al. |
| 6,215,863 B1 | 4/2001 | Bennett et al. |
| 6,219,413 B1 | 4/2001 | Burg ........................ 379/215.01 |
| 6,226,374 B1 | 5/2001 | Howell et al. ................. 379/207 |
| 6,240,449 B1 | 5/2001 | Nadeau |
| 6,260,050 B1 | 7/2001 | Yost et al. |
| 6,275,575 B1 | 8/2001 | Wu |
| 6,282,522 B1 | 8/2001 | Davis et al. |
| 6,298,062 B1 | 10/2001 | Gardell et al. |
| 6,298,129 B1 | 10/2001 | Culver et al. |
| 6,301,338 B1 | 10/2001 | Makela et al. |
| 6,301,609 B1 | 10/2001 | Aravamudan et al. ........ 709/207 |
| 6,310,939 B1 | 10/2001 | Varney |
| 6,310,947 B1 | 10/2001 | Polcyn ..................... 379/211.01 |
| 6,324,269 B1 | 11/2001 | Malik |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Chrstie |
| 6,430,289 B1 | 8/2002 | Liffick ........................ 379/900 |
| 6,434,226 B1 | 8/2002 | takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. ........... 379/142.02 |
| 6,459,913 B2 | 10/2002 | Cloutier |
| 6,463,145 B1 | 10/2002 | O'Neal et al. ........... 379/211.02 |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. ................. 455/445 |
| 6,480,830 B1 | 11/2002 | Ford et al. |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,546,005 B1 | 4/2003 | Berkley et al. ................. 370/353 |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. ......... 709/227 |
| 6,574,324 B1 | 6/2003 | Malik |
| 6,574,470 B1 | 6/2003 | Chow et al. |
| 6,577,622 B1 | 6/2003 | Schuster et al. .............. 370/352 |
| 6,577,720 B1 | 6/2003 | Sutter |
| 6,584,122 B1 | 6/2003 | Matthews et al. ............. 370/493 |
| 6,590,603 B2 | 7/2003 | Sheldon et al. |
| 6,590,969 B1 | 7/2003 | Peters et al. |
| 6,593,352 B2 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers .......................... 370/353 |

| Patent/Pub No. | Date | Name |
|---|---|---|
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 * | 2/2004 | Lindquist et al. ........ 379/218.01 |
| 6,690,672 B1 | 2/2004 | Klein |
| 6,693,897 B1 | 2/2004 | Huang |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 | 9/2004 | Barak et al. |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 | 4/2005 | Mansfield |
| 6,885,742 B1 | 4/2005 | Smith |
| 6,907,111 B1 * | 6/2005 | Zhang et al. ................ 379/88.02 |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 * | 2/2006 | Thorpe et al. ................ 379/67.1 |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 * | 5/2006 | Eitel ............ 709/202 |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper .................. 379/201.01 |
| 2002/0082028 A1 | 6/2002 | Wittenkamp |
| 2002/0082030 A1 | 6/2002 | Berndt et al. |
| 2002/0083462 A1 | 6/2002 | Arnott ........................ 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ........................ 370/389 |
| 2002/0115471 A1 | 8/2002 | DeLoye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |

| | | | |
|---|---|---|---|
| 2002/0146105 A1 | 10/2002 | McIntyre | |
| 2002/0147777 A1 | 10/2002 | Hackbarth et al. | |
| 2002/0147811 A1 | 10/2002 | Schwartz et al. ............ 709/225 |
| 2002/0152165 A1 | 10/2002 | Dutta et al. | |
| 2002/0154210 A1 | 10/2002 | Ludwig et al. | |
| 2002/0168055 A1 | 11/2002 | Crockett et al. | |
| 2002/0177410 A1 | 11/2002 | Klein et al. | |
| 2002/0178117 A1 | 11/2002 | Maguire et al. | |
| 2003/0005150 A1 | 1/2003 | Thompson et al. | |
| 2003/0014488 A1 | 1/2003 | Dalal et al. | |
| 2003/0035381 A1 | 2/2003 | Chen et al. | |
| 2003/0036380 A1 | 2/2003 | Skidmore | |
| 2003/0045309 A1 | 3/2003 | Knotts | |
| 2003/0046071 A1 | 3/2003 | Wyman et al. | |
| 2003/0053612 A1 | 3/2003 | Henrikson et al. | |
| 2003/0055735 A1 | 3/2003 | Cameron et al. | |
| 2003/0055906 A1 | 3/2003 | Packham et al. | |
| 2003/0058838 A1 | 3/2003 | Wengrovitz .................. 370/352 |
| 2003/0063732 A1 | 4/2003 | Mcknight et al. | |
| 2003/0069874 A1 | 4/2003 | Hertzog et al. | |
| 2003/0083040 A1 | 5/2003 | Ruth et al. | |
| 2003/0092451 A1 | 5/2003 | Holloway et al. | |
| 2003/0093700 A1 | 5/2003 | Yoshimoto et al. | |
| 2003/0096626 A1 | 5/2003 | Sabo et al. | |
| 2003/0097635 A1 | 5/2003 | Giannetti | |
| 2003/0104827 A1 | 6/2003 | Moran et al. | |
| 2003/0108172 A1 | 6/2003 | Petty et al. | |
| 2003/0112928 A1 | 6/2003 | Brown et al. | |
| 2003/0112952 A1 | 6/2003 | Brown et al. | |
| 2003/0119532 A1 | 6/2003 | Hatch | |
| 2003/0140004 A1 | 7/2003 | O'Leary et al. | |
| 2003/0142798 A1 | 7/2003 | Gavette et al. | |
| 2003/0147518 A1 | 8/2003 | Albal et al. | |
| 2003/0149662 A1 | 8/2003 | Shore | |
| 2003/0158860 A1 | 8/2003 | Caughey | |
| 2003/0165223 A1* | 9/2003 | Timmins et al. ......... 379/207.02 |
| 2003/0167229 A1 | 9/2003 | Ludwig et al. | |
| 2003/0169330 A1 | 9/2003 | Ben-Shachar et al. | |
| 2003/0179743 A1 | 9/2003 | Bosik et al. | |
| 2003/0179864 A1 | 9/2003 | Stillman et al. | |
| 2003/0187992 A1 | 10/2003 | Steenfeldt et al. | |
| 2003/0208541 A1 | 11/2003 | Musa | |
| 2003/0217097 A1* | 11/2003 | Eitel ............................ 709/202 |
| 2003/0228863 A1 | 12/2003 | Vander Veen et al. | |
| 2004/0002350 A1 | 1/2004 | Gopinath et al. | |
| 2004/0002902 A1 | 1/2004 | Muehlhaeuser | |
| 2004/0019638 A1 | 1/2004 | Makagon et al. ............ 709/204 |
| 2004/0034700 A1 | 2/2004 | Polcyn | |
| 2004/0037409 A1 | 2/2004 | Crockett et al. | |
| 2004/0044658 A1 | 3/2004 | Crabtree et al. | |
| 2004/0052356 A1 | 3/2004 | McKinzie et al. | |
| 2004/0081292 A1 | 4/2004 | Brown et al. | |
| 2004/0103152 A1 | 5/2004 | Ludwig et al. | |
| 2004/0119814 A1 | 6/2004 | Clisham et al. | |
| 2004/0127256 A1 | 7/2004 | Goldthwaite et al. | |
| 2004/0156491 A1 | 8/2004 | Reding et al. | |
| 2004/0184593 A1* | 9/2004 | Elsey et al. ............. 379/218.01 |
| 2004/0203942 A1 | 10/2004 | Dehlin | |
| 2004/0208305 A1 | 10/2004 | Gross et al. | |
| 2004/0247088 A1 | 12/2004 | Lee | |
| 2004/0249884 A1 | 12/2004 | Caspi et al. | |
| 2004/0264654 A1 | 12/2004 | Reding et al. | |
| 2005/0053206 A1 | 3/2005 | Chingon et al. | |
| 2005/0053221 A1 | 3/2005 | Reding et al. | |
| 2005/0102382 A1 | 5/2005 | MacGregor et al. | |
| 2005/0117714 A1 | 6/2005 | Chingon et al. | |
| 2005/0129208 A1* | 6/2005 | McGrath et al. ......... 379/218.01 |
| 2005/0191994 A1 | 9/2005 | May et al. | |
| 2005/0216421 A1 | 9/2005 | Barry et al. | |
| 2005/0220286 A1 | 10/2005 | Valdez et al. | |
| 2005/0243993 A1 | 11/2005 | McKinzie et al. | |
| 2006/0093120 A1* | 5/2006 | Thorpe et al. ............ 379/218.01 |
| 2006/0095575 A1 | 5/2006 | Sureka et al. | |
| 2006/0168140 A1 | 7/2006 | Inoue et al. | |
| 2006/0276179 A1 | 12/2006 | Ghaffari et al. | |
| 2006/0277213 A1 | 12/2006 | Robertson et al. | |
| 2007/0021111 A1* | 1/2007 | Celik ............................ 455/418 |
| 2009/0060155 A1 | 3/2009 | Chingon et al. | |

FOREIGN PATENT DOCUMENTS

| | | |
|---|---|---|
| DE | 10110942 | 9/2002 |
| EP | 0818908 | 1/1998 |
| EP | 0818908 A3 | 1/1998 |
| EP | 1014360 | 6/2000 |
| EP | 1028578 | 8/2000 |
| EP | 1161063 | 12/2001 |
| EP | 1 193 617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 7-58856 | 3/1995 |
| JP | 07-107171 | 4/1995 |
| JP | 7-107549 | 4/1995 |
| JP | 07-123098 | 5/1995 |
| JP | 08-149226 | 7/1996 |
| JP | 08-181763 | 7/1996 |
| JP | 08-298546 | 11/1996 |
| JP | 08-331642 | 12/1996 |
| JP | 9-64863 | 3/1997 |
| JP | 9-64977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-55407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-16673 | 1/2002 |
| JP | 2002-41522 | 2/2002 |
| JP | 2002-044123 | 2/2002 |
| JP | 2002-044257 | 2/2002 |
| JP | 2002057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | 96/14704 | 5/1996 |
| WO | WO-97/20423 | 6/1997 |
| WO | WO-97/033421 | 12/1997 |
| WO | WO-98/02007 | 1/1998 |
| WO | 99/38309 | 7/1999 |
| WO | WO 00/45557 | 8/2000 |
| WO | 0064133 | 10/2000 |
| WO | WO-00/60837 | 10/2000 |
| WO | WO01/11586 | 2/2001 |
| WO | WO 01/011586 A1 | 2/2001 |

| | | |
|---|---|---|
| WO | WO-01/22751 | 3/2001 |
| WO | 0135621 | 5/2001 |
| WO | 0152513 | 7/2001 |
| WO | 0189212 | 11/2001 |
| WO | WO-02/25907 | 3/2002 |
| WO | 02/43338 | 5/2002 |

OTHER PUBLICATIONS

"FAQ Premium Home Answer" eVoice, http://content.evoice.com/wcs/signUp/FAQ_premHA_s01.htm.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html.

"How Internet Radio Works," Howstuffworks, http://computer.howstuffworks.com/internet-radio.htm/printable.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

"MediaTone—the 'Dial Tone' for Web Communications Services," Webex, 2003.

Business Solutions/Professional, http://www.accessline.com/business_sol/bs_body.html.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"The Mobile Phose User Guide", http://www.mobileshop.org/usertech/wildfire.htm, printed Oct. 1, 2004.

Kornowski, J., "Wildfire at Your Back and Call-A Voice-Activated Telephone Assistant That Minds You and Your Messages", http://www.lacba.org/lalawyer/techwildfire.html, printed Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download—MP3 Recorder—Record Audio Stream to MP3 or WAV," 2002, http://www.mp3-recorder.net, Submitted on Nov. 24, 2003.

"FAQ Premium Home Answer" eVoice, http://content.evoice.com/wcs/signUp/FAQ_premHA_s01.htm, Submitted on Nov. 24, 2003.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/PrgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html, Submitted on Nov. 24, 2003.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable, Submitted on Nov. 24, 2003.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp, Submitted on Nov. 24, 2003.

"NetMeeting101," http://www.meetingbywire.comNetMeeting101.htm, Submitted on Nov. 24, 2003.

"NetMeeting102," http://www.meetingbywire.com/NetMeeting102.htm, Submitted on Nov. 24, 20003.

"Instructions on Application Sharing and Data Collaboration," VCON Escort and Cruiser, http://www.vide.gatech.edu/docs/share/, Submitted on Nov. 24, 2003.

"Instructions on Multipoint Application Sharing and Data Collaboration," VCON Escort and Cruiser with RadVision MCU, http://www.vide.gatech.edu/docs/multi-share/, Submitted on Nov. 24, 2003.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003, Submitted on Nov. 24, 2003.

Business Solutions/Professional, http://www.accessline.com/business_sol/bs_professional_body.html, Submitted on Nov. 24, 2003.

"Accessline Comms' Accessline Service, The One-Number Wonder," CommWeb, T. Kramer, Feb. 1, 2000, http://www.cconvergence.com/article/TCM20000504S0014.

"InteleScreener," 2003, http://www.intelescreener.com/howitworks.html, Submitted on Nov. 24, 2003.

"TeleZapper from Privacy Technologies," Privacy Corps—Our Review, 2002, http://www.privacycorps.com/pages/product1.htm, Submitted on Nov. 24, 2003.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm, Submitted on Nov. 24, 2003.

Data Connection, MaiNGen, "Next Generation Messaging for Service Providers," Data Connection Limited, 2003-4, Submitted on Nov. 24, 2003.

Data Connection, Strategic Computer Technology, "Directories Explained," Data Connection Ltd, 1998-2004, http://www.dataconnection.com/inetapps/direxpl.htm, Submitted on Nov. 24, 2003.

Data Connection, Strategic Computer Technology, Directory Systems, "Directories and Meta-Directories," Data Connection Ltd, 1998-2004, http://www.dataconnection.com/inetapps/directory.htm, Submitted on Nov. 24, 2003.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm, Submitted on Nov. 24, 2003.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm, Submitted on Nov. 24, 2003.

Data Connection, Strategic Computer Technology, "Messaging Software Products and Services," Data Connection Ltd, 1998-2000, http://web.archive.org/web/20000819063320/www.dataconnection.com/messging/messgidx.htm, Submitted on Nov. 24, 2003.

Data Connection, Strategic Software Technology, "DC-Share for UNIX," Data Connection Ltd, 1998-2000, http://web.archive.org/web/20000914200713/www.dataconnection.com/conf/DCshare.htm, Submitted on Nov. 24, 2003.

Data Connection, Strategic Software Technology, "DC-H.323," Data Connection Ltd, 1998-2000, http://web.archive.org/web/20001120050600/www.dataconnection.com/conf/h323.htm, Submitted on Nov. 24, 2003.

Data Connection, Strategic Software Technology, "DC-WebShare," Data Connection Ltd, 1998-2000, http://web.archive.org/web/20001016115016/www.dataconnection.com/conf/webshare.htm, Submitted on Nov. 24, 2003.

Data Connection, Strategic Computer Technology, "DC-Recorder," Data Connection Ltd, 1998-2000, http://web.archive.org/web/20001016055611/www.dataconnection.com/conf/recorder.htm, Submitted on Nov. 24, 2003.

Data Connection, Strategic Software Technology, "DC-MeetingServer," Data Connection Ltd, 1998-2000, http://web.archive.org/web/20000914200719/www.dataconnection.com/conf/meetingserver.htm, Submitted on Nov. 24, 2003.

Data Connection, Strategic Computer Technology, "DC-MeetingServer," Data Connection Ltd, 1998-2000, http://web.archive.org/web/20021201144529/www.dataconnection.com/inetapps/conferencing.htm, Submitted on Nov. 24, 2003.

Data Connection, Strategic Software Technology, "DC-VoiceNet Features," Data Connection Ltd, 1998-2000, http://web.archive.org/web/20001016102614/www.dataconnection.com/messging/vnfeat.htm, Submitted on Nov. 24, 2003.

Data Connection, Strategic Software Technology, "DC-VoiceNet," Data Connection Ltd, 1998-2000, http://web.archive.org/web/20000914200424/www.dataconnection.com/messging/vnet.htm, Submitted on Nov. 24, 2003.

Data Connection, Strategic Computer Technology, "Messaging Software Products and Services," Data Connection Ltd, 1998-2000, http://web.archive.org/web/20010305143803/www.dataconnection.com/messging/messgidx.htm, Submitted on Nov. 24, 2003.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm, Submitted on Nov. 24, 2003.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004, Submitted on Nov. 24, 2003.

Data Connection, "Integrating Voicemail Systems, A white paper describing the integration of heterogeneous voicemail systems," Michael James, Internet Applications Group, Data Connection Ltd., 2004, Submitted on Nov. 24, 2003.

Data Connection, Strategic Computer Technology, "MailNGen: Next generation messaging for Service Providers," Data Connection Ltd, 1998-2004, http://www.dataconnection.com/messaging/, Submitted on Nov. 24, 2003.

Data Connection, Strategic Computer Technology, "MailNGen: Unified Messaging," Data Connection Ltd, 1998-2004, http://www.dataconnection.com/messaging/unified_messaging.htm, Submitted on Nov. 24, 2003.

Data Connection, Strategic Computer Technology, "MeetingServer: The award-winning web conference solution for Service Providers," Data Connection Ltd, 1998-2005, http://www.dataconnection.com/conferencing/, Submitted on Nov. 24, 2003.

Data Connection, Strategic Computer Technology, "MeetingServer: The web conferencing solution for Service Providers," Data Connection Ltd, 1998-2004, http://www.dataconnection.com/coonferencing/meetingserver.htm, Submitted on Nov. 24, 2003.

Data Connection, Strategic Computer Technology, "MeetingServer: Web conferencing architecture," Data Connection Ltd, 1998-2004, http://www.dataconnection.com/conferencing/meetingserver_arch.htm, Submitted on Nov. 24, 2003.

U.S. Appl. No. 09/828,679, filed Apr. 6, 2001, Reding et al.

U.S. Appl. No. 09/785,223, filed Feb. 16, 2001, Swingle et al.

"MP3 Recorder Download—MP3 Recorder—Record Audio Stream to MP3 or WAV," 2002 http://www.mp3-recorder.net, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit Support Center-Working with Other Programs, What is Shockwave Audio Streaming?" http://www.macromedia.com/support/soundedit/how/shock/whatis.html, Submitted on Nov. 24, 2003.

"NetMeeting101," http://www.meetingbywire.com/NetMeeting101.htm, Submitted on Nov. 24, 2003.

"NetMeeting102," http://www.meetingbywire.com/NetMeeting102.htm, Submitted on Nov. 24, 2003.

"Instructions on Multipoint Application Sharing and Data Collaboration," VCON Escort and Cruiser with the RadVision MCU, http://www.vide.gatech.edu/docs/multi-share/, Submitted on Nov. 24, 2003.

"File Transfer" Microsoft Windows Technologies Windows NetMeeting, last updated Jun. 4, 1999, http://www.microsoft.com/windows/netmeeting/features/files/default.asp.

Business Solutions/Professional, http://www.accessline.com/business_sol/bs_professional_body.html.

"InteleScreener," 2003, http://www.intelescsreener.com/howitworks.html, Submitted on Nov. 24, 2003.

"TeleZapper from Privacy Technologies," Provacy Corps—Our Review, 2002, http://www.privacycorps.com/pages/product1.htm, Submitted on Nov. 24, 2003.

"A Model for Presence and Instant Messaging", M. Day, et al. Fujitsu, Feb. 2000, Network Working Group, Request for Comments 2778.

White, "How Computers Work", Millennium Edition, 1999, Que Corporation, Indianapolis, IN, all pages.

Derfler, "How Networks Work," Bestseller Edition, 1996, Ziff-Davis Press, Emeryville, CA, all pages.

Gralla, "How the Internet Works," Millennium Edition, 1999, Que Corporation, Indianapolis, IN, all pages.

Muller, "Desktop Encyclopedia of the Internet," 1999, Artech House Inc., Norwood, MA, all pages.

"Calendar Scheduling Teleconference Communication Mechanism," IBM Technical Disclosure Bulletin, IBM Corp. New York, US, vol. 37, No. 3, Mar. 1, 1994, p. 561.

http://replay.waybackmachine.org/20020207142936/http//:www.clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10.1.1.33.4361, 1998, 1-14.

Gessler, et al., "PDAs as mobile WWW browers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu.edu/viewdoc/summary?doi=1 0.1.1.40.624, 1999, 1-15.

Lauff, et al., "Multimedia Client Implementation on Personal Digital Assistants", http://citeseer.ist.psu.edu/viewdoc/summary?doi=1 0.1.1.6.6059, 1997, 1-15.

* cited by examiner

Table 1

| Response | Condition |
|---|---|
| Single Listing | One matching listing retrieved from the listing database. |
| Multiple Listings | Two or more matching listings retrieved from the listing database. |
| Non Published Listing | The telephone customer has indicated that their information is not to be released. |
| No Listing | No listings matched the requested telephone number. |
| Invalid Phone Number | The phone number is in a wrong format (too few/too many digits). |
| Service Not Available | The server reports that the downstream RDA service is not available. |
| Database Error | The listings database suffered an internal error while processing the query. |
| Query Timeout | The response from the listings database did not arrive within the specified timeout period. |

Response DTD
```
<!ELEMENT response (listing*)>
<!ATTRIBUTE response
        code #REQUIRED
        time #REQUIRED
        listingCount #IMPLIED>
<!ELEMENT listing (billingType, nonPub, phone?, name?, address?, city?, state?, zip?)>
<!ELEMENT billingType (#PCDATA)>
<!ELEMENT nonPub (#PCDATA)>
<!ELEMENT phone (#PCDATA)>
<!ELEMENT name (#PCDATA)>
<!ELEMENT address (#PCDATA)>
<!ELEMENT city (#PCDATA)>
<!ELEMENT state (#PCDATA)>
<!ELEMENT zip (#PCDATA)>
```

Single Listing
```
<?xml version="1.0" encoding="utf?8"?>
<response code="Listing Available" time="9/27/2002 10:36:30 AM" listingCount=1>
        <listing>
                <billingType>local</billingType>
                <nonPub>FALSE</nonPub>
                <phone>718 544?1713</phone>
                <name>Gu Joseph</name>
                <address> 112?20 72 Dr</address>
                <city>FOREST HILLS </City>
                <state>NY</state>
                <zip> 11375</zip>
        </listing>
</response>
```

Multiple Listings
```
<?xml version="1.0" encoding="utf?8"?>
<response code="Listing Available" time="9/27/2002 10:35:45 AM" listingCount=2>
        <listing>
                <billingType>local</billingType>
                <nonPub>FALSE</nonPub>
                <phone>914 221?7764</phone>
                <name>Jones Craig</name>
                <address>12 Hickory Kingdom Rd</address>
                <city>BEDFORD (W) </city>
                <state>NY</state>
                <zip> 10506</zip>
        </listing>
        <listing>
                <billingType>local</billingType>
                <nonPub>FALSE</nonPub>
                <phone>914 221?7764</phone>
                <name>Smith Suzanne</name>
                <address>12 Hickory Kingdom Rd<laddress>
                <city>BEDFORD (W) </city>
                <state>NY</state>
                <zip> 10506</zip>
        </listing>
</response>
```

Non Published Listing
```
<?xml version="1.0" encoding="utf?8"?>
<response code="Listing Available" time="9/27/2002 10:38:38 AM" listingCount=1>
        <listing>
                <billingType>national</ billingType >
                <nonPub>TRUE</nonPub>
        </listing>
</response>
```

No Listing
```
<?xml version="1.0" encoding="utf?8"?>
<response code="No Listings" time="9/27/2002 10:33:28 AM"/>
```

Invalid Phone Number
```
<?xml version="1.0" encoding="utf?8"?>
<response code=Phone Number Invalid" time="9/27/2002 10:39:37 AM"/>
```

Service Not Available
```
<?xml version="1.0" encoding="utf?8" ?>
<response code="Service Not Available" time="9/27/2002 11:10:32 AM"/>
```

Database Error
```
<?xml version="1.0" encoding="utf?8"?>
<response code="Db Error" time=" 9/27/2002 11:10:32 AM"/>
```

Query Timeout
```
<?xml version="1.0" encoding="utf?8"?>
<response code="Query Timeout" time="9/27/2002 11:10:32 AM"/>
```

Fig. 9B

METHODS AND SYSTEMS FOR DIRECTORY INFORMATION LOOKUP

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002, U.S. patent application Ser. No. 10/083,792, entitled "VOICE MAIL INTEGRATION WITH INSTANT MESSENGER," filed Feb. 27, 2002, now U.S Pat. No. 7,142,646, U.S. patent application Ser. No. 10/083,884, entitled "DEVICE INDEPENDENT CALLER ID," filed Feb. 27, 2002, now U.S. Pat. No. 7,190,773, and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, now abandoned, all of which claim priority to U.S. Provisional Patent Application Nos. 60/272,122, 60/272,167, both filed Feb. 27, 2001, 60/275,667, 60/275,719, 60/275,020, 60/275,031, all filed Mar. 13, 2001 and 60/276,505, filed Mar. 19, 2001, and all of which are expressly incorporated herein by reference in their entirety.

Applicants also claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002, U.S. patent application Ser. No. (10/720,661), entitled "METHODS AND SYSTEMS FOR DRAG AND DROP CONFERENCE CALLING," U.S. patent application Ser. No. (10/720,859), entitled "METHODS AND SYSTEMS FOR CONFERENCE CALL BUFFERING," U.S. patent application Ser. No. (10/721,009), entitled "METHODS AND SYSTEMS FOR COMPUTER ENHANCED CONFERENCE CALLING," U.S. patent application Ser. No. (10/720,943), entitled "METHODS AND SYSTEMS FOR REMOTE CALL ESTABLISHMENT," U.S. patent application Ser. No. (10/721,005), entitled "METHODS AND SYSTEMS FOR CALL MANAGEMENT WITH USER INTERVENTION," U.S. patent application Ser. No. (10/720,970), entitled "METHODS AND SYSTEMS FOR AUTOMATICALLY FORWARDING CALLS TO CELL PHONE," U.S. patent application Ser. No. (10/720,952), entitled "METHODS AND SYSTEMS FOR ADAPTIVE MESSAGE AND CALL NOTIFICATION," U.S. patent application Ser. No. (10/720,870), entitled "METHODS AND SYSTEMS FOR A CALL LOG," U.S. patent application Ser. No. (10/720,633, entitled "METHODS AND SYSTEMS FOR AUTOMATIC FORWARDING OF CALLS TO A PREFERRED DEVICE," U.S. patent application Ser. No. (10/720,971), entitled "METHODS AND SYSTEMS FOR MULTI-LINE INTEGRATED DEVICE OR LINE MANAGEMENT," U.S. patent application Ser. No. (10/720,784), entitled "METHODS AND SYSTEMS FOR CONTACT MANAGEMENT," U.S. patent application Ser. No. (10/720,920), entitled "METHODS AND SYSTEMS FOR NOTIFICATION OF CALL TO PHONE DEVICE," U.S. patent application Ser. No. (10/720,825), entitled "METHODS AND SYSTEMS FOR SINGLE NUMBER TEXT MESSAGING," U.S. patent application Ser. No. (10/720,944), entitled "METHODS AND SYSTEMS FOR MULTI-USER SELECTIVE NOTIFICATION," U.S. patent application Ser. No. (10/720,933), entitled "METHODS AND SYSTEMS FOR CPN TRIGGERED COLLABORATION," and U.S. patent application Ser. No. (10/720,938), entitled "METHODS AND SYSTEMS FOR PREEMPTIVE REJECTION OF CALLS," all of which are expressly incorporated herein by reference in their entirety.

TECHNICAL FIELD

The present invention generally relates to communication systems and, more specifically, to methods and systems for obtaining directory information.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

Further, conventional systems offer limited incoming call management options. One common option in conventional systems is "Caller ID," which enables a receiving party to view a calling party's telephone number. Some systems, (e.g., digital cell phones) automatically store all incoming calls in a rolling list as they are received. However, such systems typically provide limited FIFO storage and usually store only the received numbers. Further, current systems do not allow users to retrieve contact information from a calling party number on demand and to add contact information to a contact list. Also, with current systems, users cannot easily select a listing from multiple listings.

Methods, systems, and articles of manufacture consistent with certain embodiments of the present invention are directed to obviating one or more of the issues set forth above.

SUMMARY

Systems and methods consistent with the present invention may obtain contact information associated with a party using an identifier (e.g., a telephone number). In certain embodiments consistent with the present invention, systems and methods may receive a request for contact-related information associated with a party. Consistent with principles of the present invention, the request may include an identifier associated with the party. The identifier for which contact information is requested may be a telephone number received by a user (e.g., a calling party number), previously dialed by the user (e.g., from an outgoing call history or log), and/or specified by the user. The identifier could also include an e-mail address, an instant messenger address, a photograph, etc. The request for contact information may be initiated by a user and/or a device associated with the user. Methods and systems may retrieve contact-related information associated with the party using the identifying information. Methods and systems may leverage one or more networks to retrieve the contact-related information. In certain embodiments of the present invention, systems and methods may transmit a query that includes the identifier to a data operations center, which, in response, may retrieve and provide contact information. A user may access the contact information via, for example, a user terminal. In certain implementations, systems and methods consistent with the present invention may obtain contact information in order to add a contact to a user's address book or contact list.

Both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification, illustrate exemplary embodiments of the invention and, together with the description, serve to explain principles of the invention. In the drawings:

FIG. 8 illustrates exemplary information which may be communicated by elements of the environment depicted in FIG. 6 in certain embodiments of the present invention; and FIGS. 9A and 9B illustrate example programming code consistent with certain embodiments of the present invention.

DETAILED DESCRIPTION

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention. It is to be understood that other implementations may be utilized and that structural and method changes may be made without departing from the scope of present invention.

Figure 1:
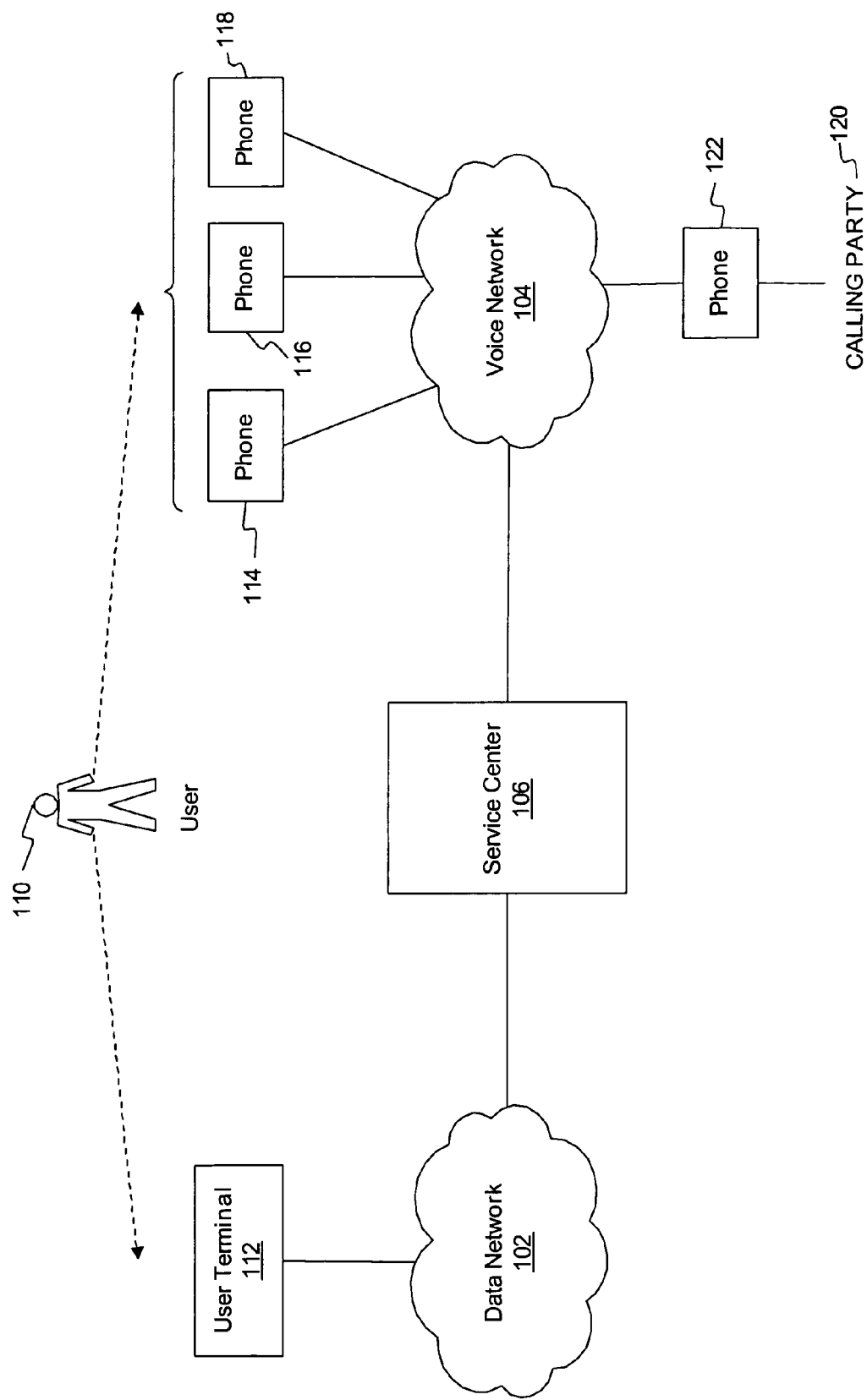
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both PSTN and VoIP technology consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
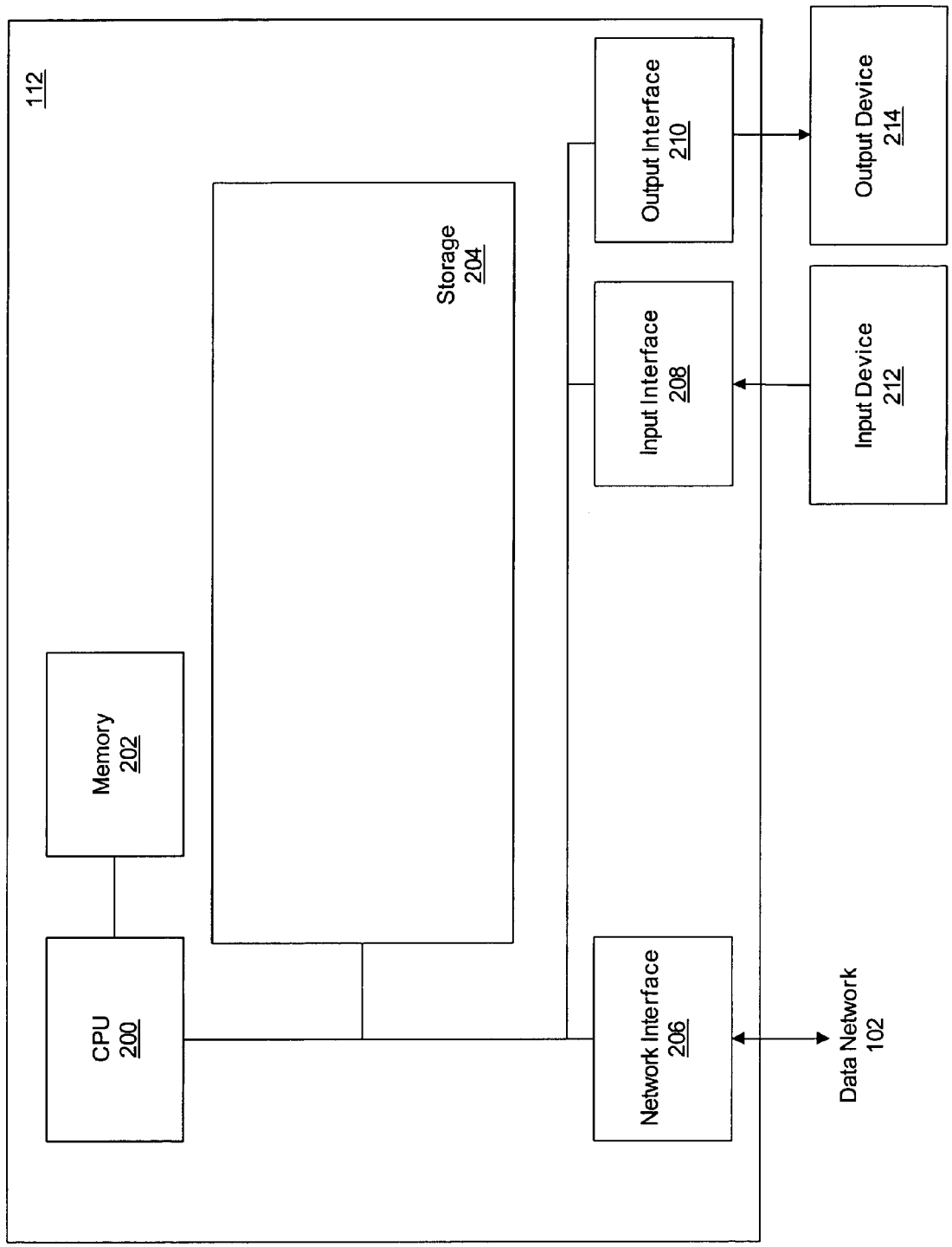
FIG. 2 is a diagram of an exemplary user terminal, consistent with the principals of the present invention.

FIG. 2 is a block diagram of a user terminal consistent with the present invention. User terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
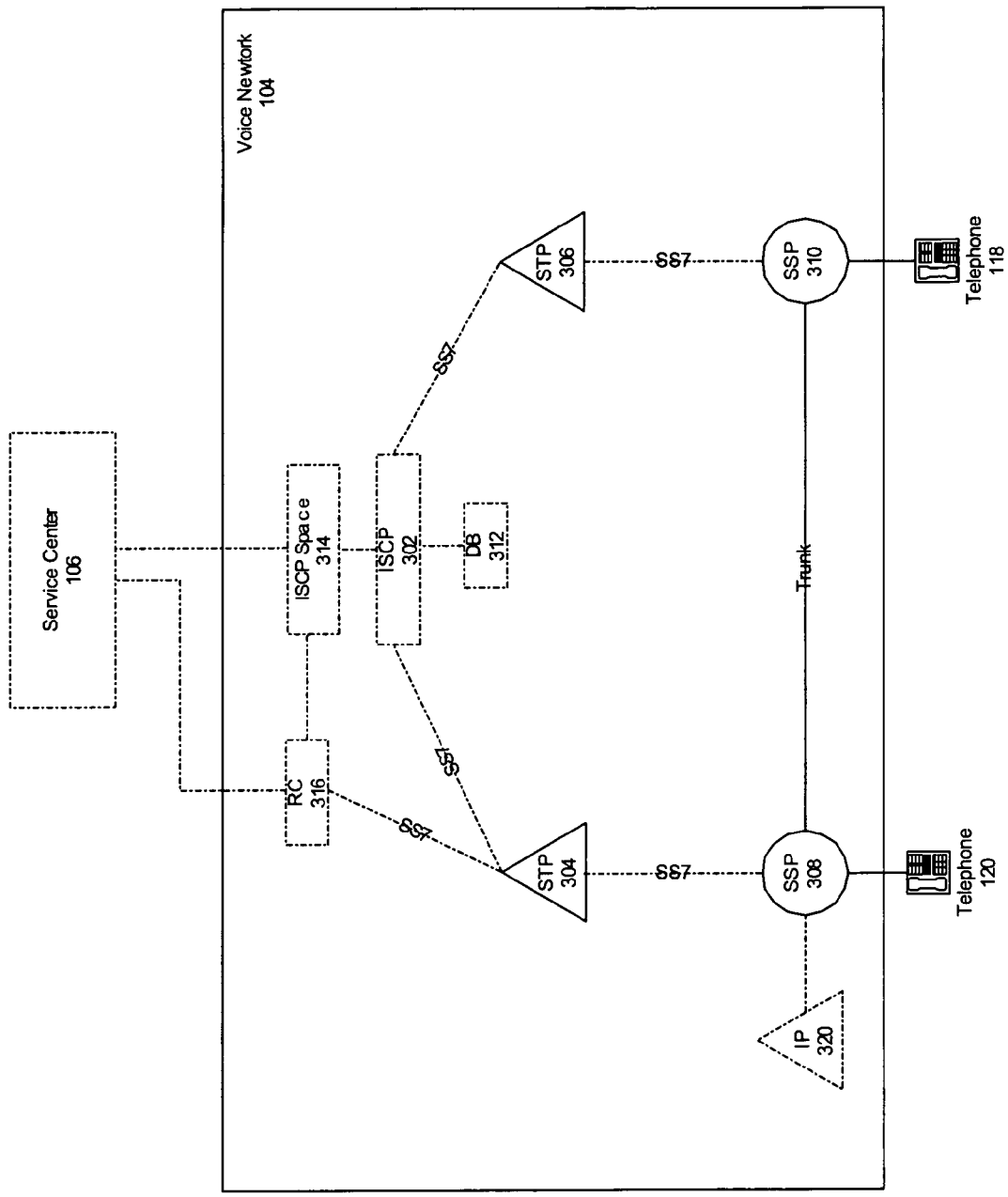
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (MIS); or a multi-services platform (MSP). As an example, the eRC and MIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an MIS is used for providing updates to ISCPs 302.

Additionally, voice network 104 may include one or more intelligent peripherals (IP). For example, in FIG. 4, an IP 320 is illustrated as being connected to SSP 308. These IPs may be used for providing services, such as voice mail services.

Figure 4:
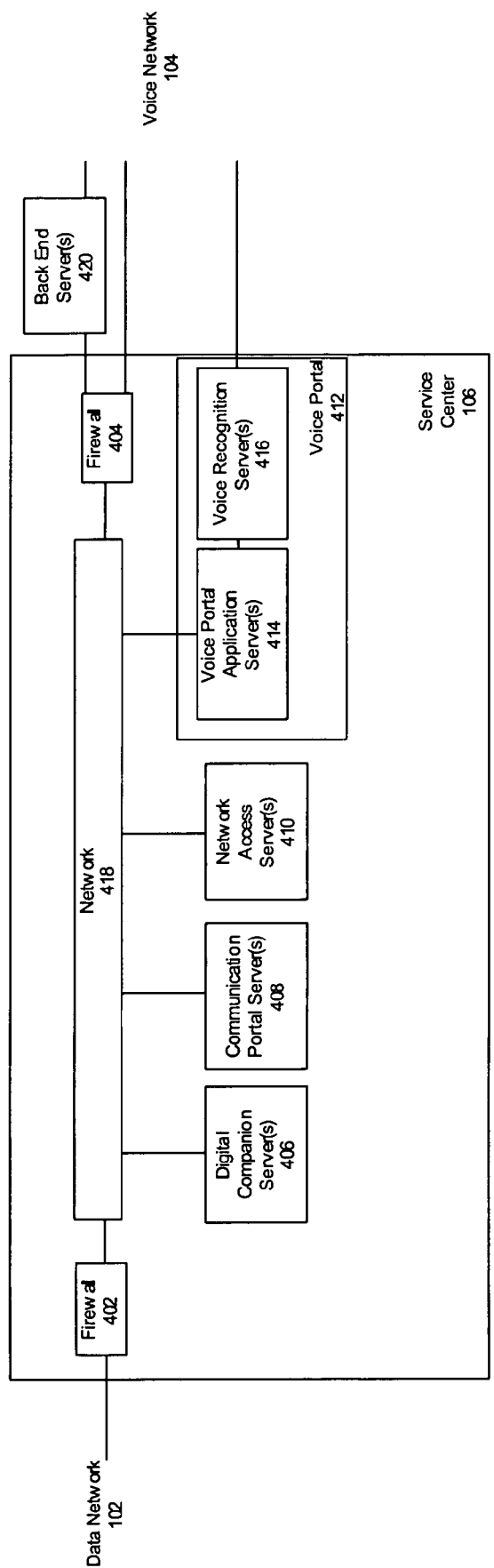
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any type of server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with principles of the present invention, digital companion server 406 may facilitate acquisition of contact information associated with a caller upon receipt of the caller's telephone number (i.e., a Calling Party Number).

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
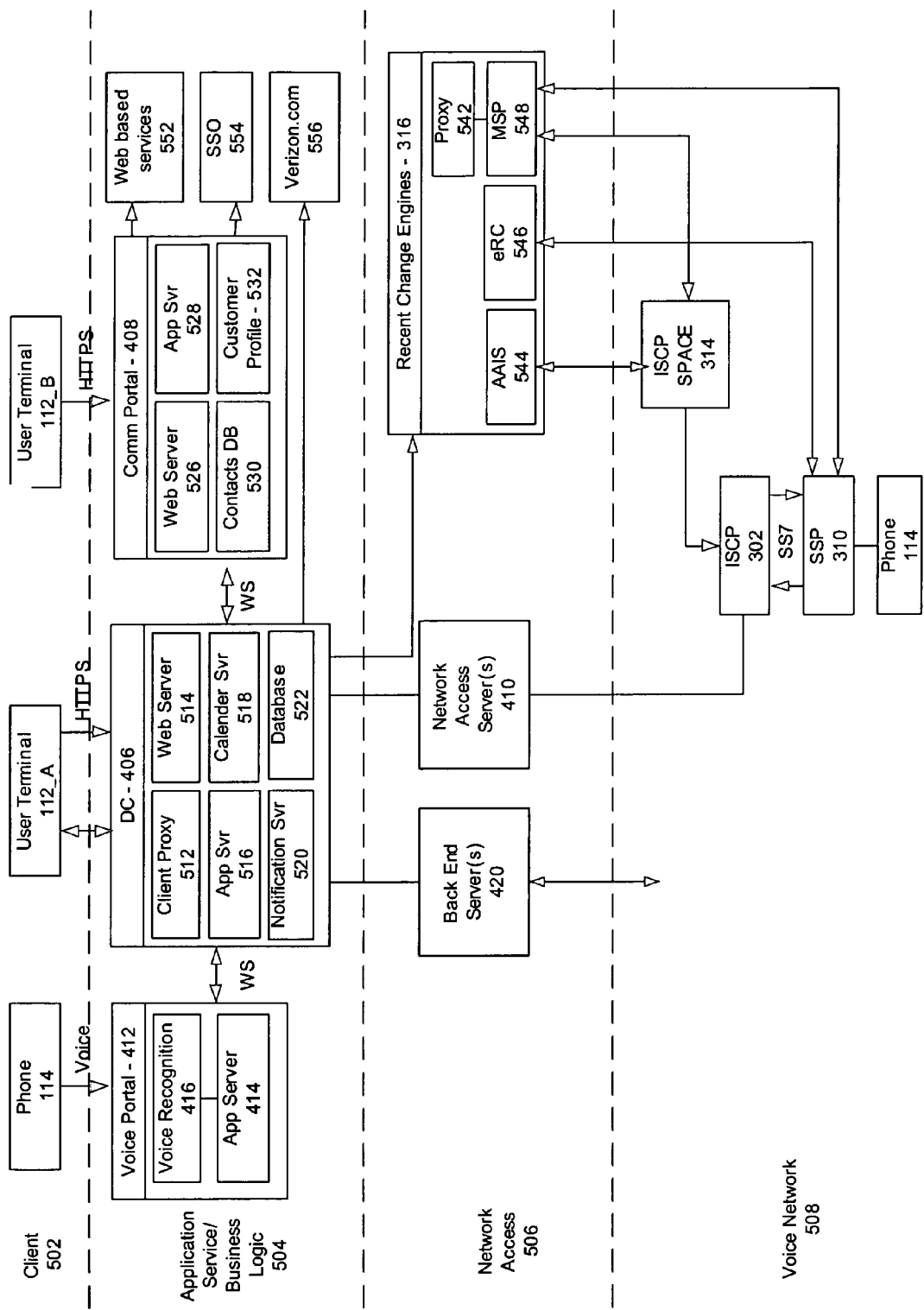
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and the voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with principles of the present invention, application server function 516 may facilitate obtaining contact information associated with a Calling Party Number (CPN) when the customer receives an incoming call from the CPN.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any type of address book. For example, the user's address book may include the names, phone numbers, and addresses of people and/or organizations. These storage devices may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include the recent change engines 316, network access servers 410, and/or back end servers 420.

As discussed above, recent change engines 316 may be used to update switches and ISCP databases included in voice network 104. In one embodiment, recent change engines 316 may include an MIS 544, an eRC 546, and/or an MSP 548. Additionally, a proxy 542 may be used between digital companion servers 406 and recent change engines 542 for security purposes.

Network access servers 410 may be included in the service center 106 and may provide the hardware and software for sending and receiving information to voice network 104 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request. Additional details of the RDA gateway and DOC are described below in connection with FIG. 6.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing the service center 106 with a SMS gateway in voice network 104. This may be used for example to permit the customer to have SMS messages addressed to their home phone number directed to an SMS capable device of the users chosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may co-exist or be distributed among several geographically dispersed locations.

In certain embodiments, methods and systems consistent with present invention may perform a Reverse Directory Assistance (RDA) lookup. As used herein, the term "RDA lookup" refers to obtaining contact-related information associated with a party by way of a telephone number or other identifier associated with that party. As used herein, the term "party" encompasses any entity for which contact-related information may be retrieved, such as individuals, groups, businesses, retail establishments, service providers, etc. Consistent with embodiments of the present invention, contact-related information may include one or more of a name, home address, business address, home telephone number, business telephone number, cell phone number, instant messenger address, IP address, biometric information (e.g., fingerprints, voice prints, retinal scans, etc.) visual information (e.g., digital images, photographs, etc.), audio information, personal information (e.g., birth date, favorite movies, favorite songs, etc.), public records, credit reports, police records, driving records, banking statements, and contact-related information associated with relatives and/or friends. In certain embodiments, contact-related information may include information associated with, or retrieved via, one or more networks.

Although a telephone number is used herein to explain principles and aspects of the present invention, the present invention contemplates the use of other identifiers to retrieve information associated with parties, such as e-mail addresses, fax numbers, Caller ID information, predetermined ID codes, network addresses, photographs, digital images, audio signals, video signals, etc. For example, a photo of an individual may be used to retrieve contact-related information associated with that individual.

Consistent with principles of the present invention, an RDA lookup may be triggered by a Calling Party Number (CPN). For example, upon user 110 receiving (via telephones 114, 116, etc.) a call from a caller (having an associated CPN), contact information may be obtained for the caller using the received CPN. Additionally or alternatively, an RDA lookup may used to obtain information associated with telephone numbers stored in a history (or call log) of incoming and/or outgoing calls. Further, a user could specify a telephone number for which to obtain contact information by for, example, inputting the number to user terminal 112. In one embodiment of the present invention, user 110 could initiate an RDA lookup. Also, one or more systems associated with user 110 (e.g., user terminal 112 and server 406) could automatically initiate an RDA lookup. Consistent with embodiments of the present invention, contact information may be obtained in order to add a party to a user's address book or contact list, which may, as mentioned above, be maintained by contacts database 530.

Figure 6:
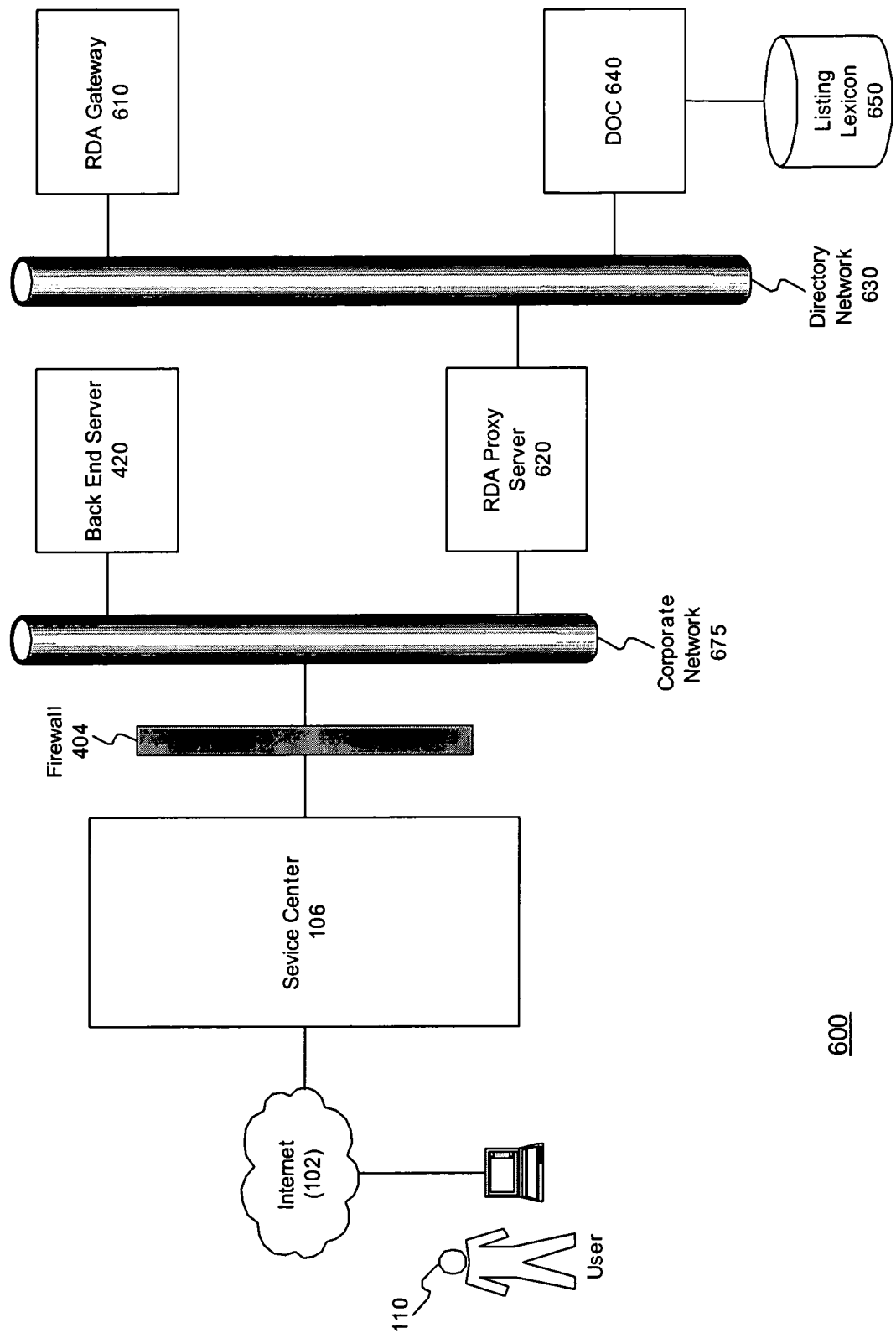
FIG. 6 is a diagram illustrating an environment in which features and aspects consistent with certain embodiments of the present invention may be implemented.

FIG. 6 illustrates an environment 600 in which RDA processes consistent with embodiments of the present invention may be implemented. As illustrated, environment 600 may include service center 106, data network 102, back end server 420, an RDA Gateway 610, an RDA proxy server 620, a directory network 630, a Data Operations Center (DOC) 640, and a listings lexicon 650.

As mentioned above, back end server 420 may include hardware and/or software for interfacing service center 106 with voice network 104. In one example, back end server 420 may include or leverage one or more search engines. Back end server 420 may be connected to service center 106 via a network (e.g., corporate network 675), a direct connection, or in any other suitable manner. Further, back end server 420 may connect to one or more devices in voice network 104 by a network, a direct connection, or in any other suitable manner. In environment 600, back end server(s) 420 may include or be configured to operate as one or more RDA application server(s). As such, back end server 420 may interface service center 106 with RDA Gateway 610 of voice network 104.

In certain embodiments, one or more firewalls (e.g., firewall 404) may be interposed between back end server 420 and one or more servers within service center 106 to provide security services. Such firewalls may be implemented external to service center 106, as illustrated in FIG. 6, and/or implemented within service center 106.

RDA Gateway 610 may include one or more devices, components and/or processes (e.g., implemented in software, firmware, and/or hardware) configured to facilitate information exchange between back end server 420 and voice network 104. In certain configurations, RDA Gateway 610 may perform routing functions, switching functions, code conversions, and/or protocol conversions. RDA Gateway 610 may, consistent with embodiments of the present invention, accept messages and requests from back end server 420, issue requests/queries for contact information, and provide information, which may include contact information, back to server 420. In one example, RDA Gateway 610 may accept HTTP messages from back end sever 420 and respond to server 420 using XML. Alternatively, the Standard Generalized Markup Language (SGML) and/or any other language that facilitates the creating and sharing of common information formats may be employed. In one embodiment, RDA Gateway 610 may send server 420 a Document Type Definition (DTD), which describes response format(s). In addition, or as alternative to a DTD, any other schema and/or means for validating a language (e.g., XML) may be employed for describing response formats. Additional details of responses are discussed below in connection with FIGS. 7 and 8.

As illustrated in FIG. 6, RDA Gateway 610 may be coupled to a directory network 630. Directory network 630 may, in certain implementations, be coupled to or included in voice network 104. Directory network 630 may include any combination of components and/or services configured to provide contact-related information. Directory network 630 may include, for example, Verizon's™ LiveSource National Directory Assistance network and/or any other directory and/or operator service network.

In exemplary implementations, directory network 630 may include or be coupled to DOC 640. DOC 640 may include one or more devices, mechanisms, and/or services for maintaining, and/or processing requests for, contact-related information. In environment 600, DOC 640 may include or be coupled to a lexicon 650, which may be a compilation of contact-related information (e.g., listing information) associated with callers. Lexicon 650 may, for example, be implemented via one or more databases, such as a relational database, a distributed database, and/or an object-oriented programming database. Information included in lexicon 650 may be obtained, maintained, and updated via one or more telephone companies (e.g., Verizon™), listing house sources, and/or operator referrals. Listing information may include, but is not limited to, one or more of: a phone number, name, street, city, state, zip code, non published flag, and billing type (e.g., local or national).

In certain embodiments, environment 600 may include RDA proxy server 620, which may serve as an application level proxy server that allows known/trusted messages to pass between service center 106 and RDA Gateway 610. RDA proxy server 620 may, for instance, log errors and attempts by other devices to gain access to the trusted network segment.

Figure 7:
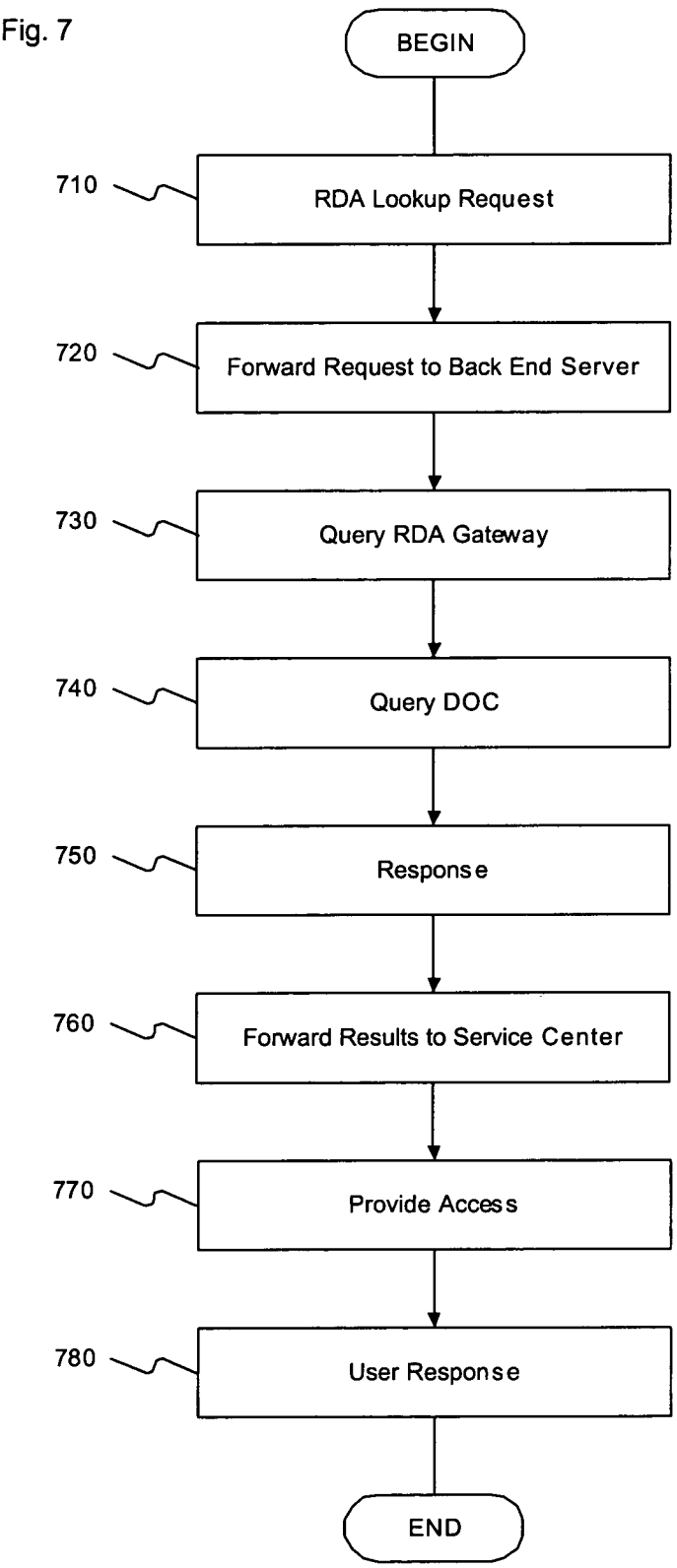
FIG. 7 is a flowchart depicting stages of a method consistent with certain embodiments of the present invention.

FIG. 7 is a flowchart depicting exemplary stages in an RDA lookup process consistent with embodiments of the present invention. The illustrated process may begin with an RDA lookup request (stage 710). In certain implementations, an RDA lookup request may be initiated by user 110 and/or a device associated with user 110 in response to a user action/ input. Initiating (or triggering) an RDA request may involve generating and/or transmitting, as well as causing the generation/transmission of, the request. In one example, user terminal 112 may transmit, in response to instructions received by user 110, an RDA lookup request for a particular telephone number to digital companion server 406 in service center 106. User 110 may, in certain instances, trigger an RDA lookup for a CPN upon viewing a CPN from a caller ID display. Further, a user could trigger an RDA lookup request by for, example, inputting a telephone number to, or selecting a telephone number from, user terminal 112. User 110 may, additionally or alternatively, trigger an RDA lookup by selecting a telephone number from a history of incoming and/or outgoing calls (i.e., a call log), which may be stored, for example, by one or more elements within service center 106 and accessible by user terminal 112. In certain embodiments of the present invention, user 110 may be prompted to initiate an RDA lookup request. For example, server 406 and/or user terminal 112 may prompt user 110 to initiate an RDA request when an outgoing or incoming call occurs or is logged. User 110 may, for instance, initiate an RDA request in order to add a contact to an address book or contact list (e.g., stored by contacts database 530).

Consistent with embodiments of the present invention, an RDA lookup request may be initiated (stage 710) by a device associated with user 110 automatically, without user action/input and with or without a user's knowledge. In one example, an RDA lookup request may be initiated (e.g., by user terminal 112 and/or server 406) when an incoming call is received by a calling device associated with user 110 (e.g., telephone 114). Additionally, an RDA request could be initiated automatically by user terminal 112 and/or service center 106 (via server 406) when a contact is being added to user 110's contact list. That is, obtaining contact information for a telephone number could be part of the process of adding a contact to the contact list. Consistent with principles of the present invention, incoming and/or outgoing calls may be logged by one or more elements in service center 106 (e.g., server 406), and service center 106 may (e.g., via server 406) automatically initiate RDA requests for such numbers. Such requests may be automatically initiated to add contacts to a user's address book. In certain embodiments, RDA processes may be leverage to update or refresh a user's address book. In such embodiments, RDA lookup requests may be initiated automatically and/or on demand in order to update a user's address book with current contact-related information. In one example, a user may input a command (e.g., via user terminal 112) that initiates one or more RDA lookup requests in order to refresh the address book. Additionally, or alternatively, RDA lookup requests may be periodically initiated, without user intervention, in order to refresh the address book.

After an RDA lookup request is initiated, the request may be forwarded to back end server 420 (stage 720). In certain embodiments, the RDA lookup request may be transmitted from service center 106 (e.g., from server 406) to back end server 420. The RDA lookup request may also be routed through firewall 404. Upon receiving the request, back end server 420 may authenticate the request and transmit an RDA query to RDA Gateway 610 (stage 730). Authenticating the request may be optional.

In certain embodiments, upon receiving the request (stage 720), back end server 420 may, in addition or as alternative to transmitting an RDA query to RDA Gateway 610, leverage one or more search engines and/or network services (e.g., Google, Super Pages) to retrieve certain contact-related information. In one example, back end server 420 may leverage one or more search engines to retrieve certain contact-related information (e.g., public records from the Internet) and, in addition, transmit an RDA request for other information (e.g., listing information) to RDA Gateway 610. In other examples, back end server 420 may retrieve contact-related information, and RDA Gateway 610 may be unnecessary. In such cases where RDA Gateway 610 is not leveraged, stages 730-750 may not be performed in the process of FIG. 7.

An RDA query transmitted from back end server 420 to RDA Gateway 610 (stage 730) may, in one implementation, include the telephone number for which contact information is desired and an identifier associated with user 110 (customer ID). As explained above, the telephone number for which contact information is requested may be a telephone number received by user 110 (e.g., a calling party number), previously dialed by user 110 (e.g., from an outgoing call history or log), and/or specified/selected by user 110. The customer ID may, for example, include user 110's primary telephone number. In certain embodiments of the present invention, the RDA query may be transmitted or routed from back end server 420 to RDA Gateway 610 through RDA proxy server 620. Back end server 420 may, in certain embodiments, transmit the RDA query to RDA Gateway 610 via HTTP. In one example, the RDA query may be in the form of a Universal Resource Locator (URL) having the following exemplary format:

http://RDAGateway/RDAQuery.aspx?customerID=2129999999&lookupID=2125551212 In the above example URL, RDAGateway may be a name or IP address associated with RDA Gateway 610; customerID may be the primary telephone of user 110; and lookupID may be the telephone on which the query is performed.

Upon receiving the RDA query, RDA Gateway 610 may forward the query to DOC 640 (stage 740). As described above, DOC 640 may include or be coupled to listing lexicon 650, which may be implemented via one or more database(s). Accordingly, RDA Gateway 610 may query the listing lexicon for contact information associated with the telephone number included in the query. Consistent with principles of the present invention, RDA Gateway 610 may expect a response from listing lexicon 650 as described in an Interface Protocol Specification provided by a database vendor. In response to the RDA query, DOC 640 may provide (e.g., to RDA Gateway 610) listing information associated with the telephone number in the query. For example, a phone number, name, street, city, state, and/or zip code may be returned. Additionally or alternatively, one or more flags and/or errors may be returned. For example, if the particular party associated with the telephone number of interest has indicated that contact information is to remain private, a non-published flag may be returned from DOC 640. DOC 640 may also provide an indication of an internal processing error or timeout period expiration. Information provided by DOC 640 may also include a billing type (e.g., local or national) for user 110. Consistent with principles of the present invention, single listings and/or multiple listings may be provided by DOC 640 for a given telephone number. For example, families may list spouses and children separately and with the same number, and small business may list multiple parties with a particular number.

After sending the RDA query to DOC 640, RDA Gateway 610 may send a response to back end server 420 (stage 750). At this stage, RDA Gateway 610 may also record the customer ID to facilitate billing. The response may, in one example, include (or reflect) information provided by and received from DOC 640. RDA Gateway 610 may, in one configuration, respond to back end server 420 via XML. RDA Gateway 610 may therefore convert/format information received from DOC 640 to an XML message and route the message to back end server 420. As mentioned above, RDA Gateway 610 may send server 420 a Document Type Definition (DTD), which describes response format(s). RDA Gateway 610 may, in certain configurations, support one or more of the following response types: Single Listing, Multiple Listings, Non-Published Listings, No Listing, Invalid Phone Number, Service Not Available, Database Error, Query Timeout. Table 1 of FIG. 8 illustrates the above-mentioned responses and their corresponding conditions; FIGS. 9A and 9B collaboratively illustrate XML format 900, which depicts an example XML format for each response.

Consistent with embodiments of the present invention, the response to back end server 420 may include contact-related information (e.g., listing information) associated with the telephone number of interest, which may be received from DOC 640. For example, the response from Gateway 610 to back end server 420 may include one or more of: a phone number, name, street, city, state, zip code. The response may also include network-related information, public records, family information, images, audio information, etc. In addition, the response may include (or reflect) one or more flags and/or errors, as discussed above.

In the illustrated process of FIG. 7, back end server 420 may forward RDA lookup results to one or more components in service center 106 (stage 760). For example, such results (e.g., listing information, flags, errors, etc. received from DOC 640 via RDA Gateway 610) may be transmitted to server 406. In addition, or as an alternative, contact-related information retrieved by back end server 420 using one or more search engines and/or network services may be transmitted to server 406. The process of FIG. 7 may then provide user 110 with access to the RDA lookup results (stage 770). Access may, for example, be provided via server 406 and user terminal 112. Providing access to RDA lookup results (stage 770) may involve presenting user 110 with listing information associated with the telephone number of interest. Providing access to RDA lookup results may also involve notifying user 110 that one or more errors occurred or that information is not available (e.g., not published) for the telephone number of interest.

After access is provided to user 110 (stage 770), user 110 may respond to the RDA lookup results (stage 780). In one example, where listing information is obtained, user 110 may select listing information (stage 780) to add to the contact list. For example, user 110 may input a command to user terminal 112 that causes the listing information to be inserted in the contact list. In certain embodiments, user terminal 112 may, in response to such a command, communicate with service center 106 (e.g., server 406), thereby causing the information to be added to the contact list. In some instances, as mentioned above, multiple listings for a number may be obtained and presented to the user. In such instances, user 110 may select one or more of the listings to add to the contact list. If errors have occurred or information is not available for a particular number, user 110 may initiate another RDA lookup request for the same or different number. In alternative embodiments, user 110 may select listing information for other processing (e.g., by server 406). Responding to results (stage 780) may also involve responding to one or more error messages.

The steps illustrated in the flowchart of FIG. 7 are consistent with exemplary implementations of the instant invention. Further, it should be understood that the sequence of events described in FIG. 7 are exemplary and not intended to be limiting. Thus, other method steps may be used, and even with the method depicted in FIG. 7, the particular order of events may vary without departing from the scope of the present invention. Moreover, certain steps may not be present and additional steps may be implemented in FIG. 7. In addition, it should be understood that the stages of FIG. 7 may be modified with departing from the scope of the present invention. For example, in certain implementation, information may be exchanged between DOC 640 and back end server 420 without the use of RDA Gateway 610.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed embodiment, implementation, or configuration. Thus, the true scope and spirit of the invention depends on the following claims.

What is claimed is:

1. A method for obtaining contact information, the method comprising:
 receiving, by a service center, a request initiated by a user for contact information associated with a telephone number;
 querying, by the service center and in response to the request, a directory for the contact information;
 querying, by the service center and in response to the request, an Internet search engine for the contact information;
 receiving, via the service center, the contact information from the directory and the Internet search engine; and
 automatically storing, via the service center, the contact information in a contact list associated with the user in response to receiving the contact information via the service center.

2. The method of claim 1, where the telephone number for which contact information is requested includes a telephone number associated with a call received by the user.

3. The method of claim 1, where the telephone number for which contact information is requested includes a telephone number previously dialed by the user.

4. The method of claim 1, where the telephone number, for which contact information is requested, is specified by the user.

5. The method of claim 1, further comprising:
 providing the user with access to the contact information.

6. A method for obtaining contact information in a system that includes a user terminal, a service center, and a server, the method comprising:

receiving, by the service center, a request from the user terminal for contact information associated with a party, the request including identifying information associated with the party;

forwarding the request from the service center to the server;

transmitting, in response to the request, a query including the identifying information from the server to a directory and to an Internet search engine;

receiving at least one response by the server from at least one of the directory or the Internet search engine;

forwarding the at least one response from the server to the service center;

providing a user of the user terminal with access to the contact information when the at least one response includes the contact information; and automatically storing the contact information in a contact list maintained by the service center when the at least one response includes the contact information, where the contact list is associated with the user.

7. The method of claim 6, where receiving a request including identifying information comprises receiving a request that includes one of a name, a telephone number, or a network identifier.

8. The method of claim 6, where receiving a request including identifying information comprises receiving a request that includes an e-mail address.

9. The method of claim 6, where receiving a request including identifying information comprises receiving a request that includes one of an audio signal, a video signal, a photograph, or a digital image.

10. The method of claim 6, where automatically storing the contact information in the contact list is performed without user intervention.

11. The method of claim 6, where transmitting a query including the identifying information from the server includes transmitting a query including a telephone number and an identifier associated with the user of the user terminal.

12. The method of claim 6, where the directory includes a directory assistance service maintained by at least one service provider.

13. The method of claim 6, where providing the user with access to the contact information includes providing the user with access to at least one of a name, a street, a city, a state, a zip code, a facsimile number, or an e-mail address associated with the party.

14. A communications system comprising:
a user device, coupled to a network, configured to transmit a request for contact information associated with a telephone number;
a service center, associated with the user device, configured to receive the request for contact information from the network; and
a server, coupled to the service center, configured to:
query, in response to the request and using the telephone number, a directory to obtain the contact information,
query, in response to the request and using the telephone number, an Internet search engine to obtain the contact information,
receive a response to the query from at least one of the directory or the Internet search engine, and
forward the response received from at least one of the directory or the Internet search engine to the service center, the service center automatically storing the response in a contact list that is associated with a user requesting the contact information when the response includes the requested contact information.

15. The system of claim 14, where the directory includes a directory assistance service maintained by at least one service provider.

16. The system of claim 14, where the user device is one of a general purpose computer, a personal computer, a Blackberry™ device, a Ergo Audrey™ device, a wireless device, or a Personal Digital Assistant.

17. The system of claim 14, where the response comprises listing information that includes at least one of a name, a street, a city, a state, a zip code, a facsimile number, or an e-mail address.

18. The system of claim 17, where the service center provides the user with access to the listing information via the network.

19. The system of claim 17, where the service center stores the listing information in a contact list associated with the user.

20. The system of claim 14, where the response indicates that information associated with the telephone number is not available to the public.

21. The system of claim 14, where the response indicates a billing type associated with the telephone number.

22. The system of claim 14, where the response includes at least one error message.

23. The method of claim 6, further comprising:
forwarding an error message to the user when the at least one response indicates that an error has occurred or that the contact information is private.

24. The method of claim 6, where the query is in the form of a Universal Resource Locator (URL).

25. The method of claim 6, where the response includes a billing type associated with the contact information.

26. The method of claim 6, where the contact information includes information associated with more than one party.

* * * * *